United States Patent Office 3,428,567
Patented Feb. 18, 1969

3,428,567
STABILIZER FOR POLYOLS
Robert A. Newton, Lake Jackson, Tex., assignor to The Dow Chemical Company, Midland, Mich., a corporation of Delaware
No Drawing. Filed Nov. 3, 1965, Ser. No. 506,257
U.S. Cl. 252—188.3
Int. Cl. C09k 3/00
3 Claims

ABSTRACT OF THE DISCLOSURE

Phenothiazine is used as a stabilizer to prevent discoloration and deterioration of mixtures of aliphatic polyols and halogenated aliphatic hydrocarbons. It is particularly useful in formulations used to make polyurethane foams.

---

This invention relates to stabilizers for aliphatic polyols. These stabilizers inhibit the reaction of polyols with halocarbons and halohydrocarbons and thus inhibit the discoloration, the evolution of gases, and the corrosion of containers by such materials.

Mixtures comprising halocarbons or halohydrocarbons and polyols are of technical importance, especially in the polyurethane industry, and the deterioration of such mixtures is a recognized problem, as is shown, for example, in U.S. Patents 3,155,625 and 3,137,662. A similar problem is encountered with monohydric alcohols instead of polyols (see U.S. Patent 3,085,116). The problem is particularly severe with aminopolyols, especially those made by the oxyalkylation of aliphatic polyamines, as is more fully taught in the first two of the above-cited patents.

While the above problem arises to some extent with a wide variety of halogenated lower aliphatic hydrocarbons, it is of primary importance with those set forth in the above patents, and especially with $CFCl_3$, this being a species that is both widely used and highly susceptible to the above degradation with polyols.

According to the invention, the degradation, discoloration and deleterious reaction of polyols with aliphatic halocarbons and halohydrocarbons can be inhibited and the polyols can be stabilized by the incorporation therein of a small but effective proportion of phenothiazine.

The amount of the phenothiazine required for satisfactory stabilization varies considerably, depending on the particular materials employed and the conditions under which stability is to be maintained. For most materials under ordinary conditions as little as 0.01% by weight, or even less, will provide substantial stabilization. Under severe conditions as much as 2–3% or even 5% may be advantageously used.

The polyols that are stabilized include substantially any polyol compositions that reacts with and deteriorates in the presence of halocarbons or halohydrocarbons. These include the simple glycols, polyoxyalkylene glycols, polyols made by the oxyalkylation of initiators having a multiplicity of reactive hydrogens, such as glycerol, pentaerythritol, sucrose, ethylenediamine, diethylenetriamine, bisphenol A, oxydiphenol, methylenedianiline and the like. Such polyol compositions in combination with halocarbons and halohydrocarbons are widely used in the production of polyurethanes. In such compositions adequate stabilization is obtained by the incorporation therein of a small proportion of phenothiazine.

The practice of the invention is illustrated by the following examples.

A polyol formulation that is typical of those used in the polyurethane rigid foam industry was prepared. It comprised 68 parts by weight of Voranol RS-375, a commercial product made by condensing propylene oxide with sucrose until the product has an OH equivalent weight of about 150, 3.5 parts of Voranol UI-800, a commercial product made by successively condensing one mole of ethylene oxide and three moles of propylene oxide with one mole of ethylenediamine, and 28.3 parts of $CFCl_3$. Inclusion of conventional catalysts, surfactants or foam regulators and the like in the above formulation made no significant difference in the result in that the stability of the system was improved by the addition of the alkylene oxide stabilizers.

The stability tests consisted of placing 50 g. of the polyol formulation, with or without stabilizer, in a 160 ml. bottle which was then sealed and placed in a water bath at 80° C. for 24 hrs. Lack of stability was measured by color and by titrating the acidity of the polyol at the end of the test period. For the titration the material was dissolved in anhydrous methanol and titrated with 0.1 N aqueous NaOH. The color recorded was the APHA platinum-cobalt color of a 5% solution in acetone. The results of some typical tests are shown in the following table.

| Phenothiazine, percent by wt. | Acidity, micro-equiv. per g. | Color |
|---|---|---|
| None | 56 | 130 |
| 0.1 | 5 | 35 |

A particularly valuable feature of phenothiazine as a stabilizer is that, unlike most other stabilizers, its effectiveness is not impaired by the presence of air on contact with the polyol composition. This is shown by the following examples in which a polyol composition similar to that described above was used. It comprises Voranol RS-375, 66 parts, Voranol UI-800, 3.5 parts and $CFCl_3$, 27.5 parts (all by weight). Into a series of glass bottles having a capacity of 160 g. was placed varying amounts of the formulation, the remaining space being filled with air and vapors, except that one was flushed with nitrogen to remove air. All were capped and placed in a water bath at 80° C. where they were rotated for 16 hrs. The contents were then titrated for acidity and examined for color as in the above tests. Results are shown in the following table:

| Sample, g. | No Inhibitor | | 0.8% Nitromethane [1] | | 0.1% Phenothiazine | |
|---|---|---|---|---|---|---|
| | Acidity | Color | Acidity | Color | Acidity | Color |
| 15 | 142.0 | 250 | 86.0 | 250 | 13.8 | 65 |
| 50 | 45.4 | 155 | 36.0 | 250 | 12.8 | 65 |
| 150 | 32.0 | 135 | 24.0 | 155 | 13.4 | 65 |
| 50 [2] | 20.2 | 105 | 11.6 | 75 | 16.4 | 100 |

[1] A known stabilizer for such compositions.
[2] Purged with nitrogen.

I claim:
1. A composition consisting essentially of a mixture of (1) a polyoxyalkylene polyol and (2) a halogenated lower aliphatic hydrocarbon, which mixture normally tends to deteriorate because of the interaction of its components and, as a stabilizer therefor, (3) phenothiazine in an amount effective to inhibit said deterioration.
2. The composition of claim 1 wherein the component (2) is $CFCl_3$.
3. A mixture as defined in claim 2 wherein the polyol comprises the compound of the Formula III

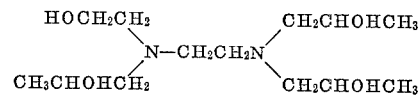

References Cited

UNITED STATES PATENTS 3,214,397   10/1965   Cox _____ 260—45.8 XR

LEON D. ROSDOL, Primary Examiner.
STANLEY D. SCHWARTZ, Assistant Examiner.

U.S. Cl. X.R.
260—2.5, 45.8, 652.5